Dec. 28, 1948.  C. J. THOMPSON  2,457,751
TEMPERATURE MEASURING APPARATUS
Filed June 17, 1946
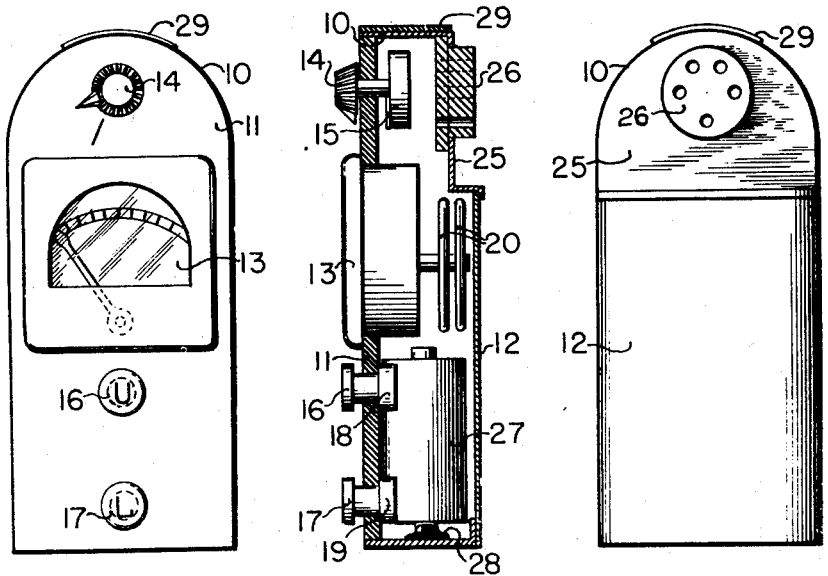
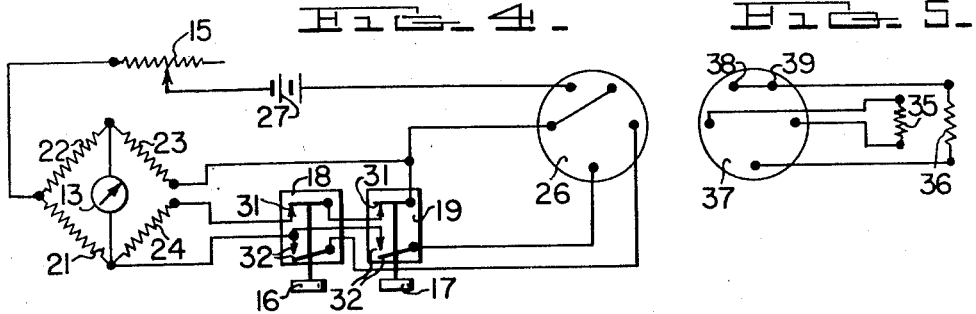
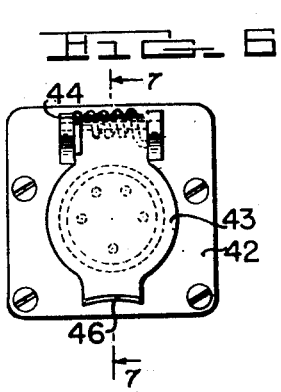 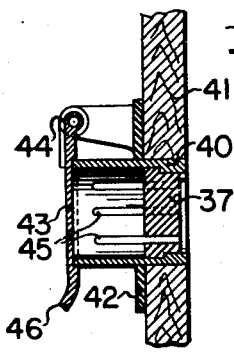
Inventor
Clifford J. Thompson
By Lee B. Kenon.
Attorney Patented Dec. 28, 1948

2,457,751

UNITED STATES PATENT OFFICE 2,457,751

TEMPERATURE MEASURING APPARATUS

Clifford J. Thompson, Davenport, Fla., assignor to Fruit Growers Express Company, a corporation of Delaware Application June 17, 1946, Serial No. 677,391

3 Claims. (Cl. 73—342)

This invention relates to temperature measuring apparatus and more particularly to a portable device for measuring and indicating the temperature within a closed refrigerator car, warehouse, vehicle, ship, or the like.

Various systems and devices are known for electrically measuring and indicating, at a remote point, the temperature of an object or the air temperature within a closed space. The use of a Wheatstone bridge circuit in such systems is also known. The instruments generally used are bulky, slow acting, intricate, and expensive. The present invention relates to an improved device which may be utilized to quickly and accurately indicate the temperatures within each of a series of refrigerator cars or the like by plugging the device into suitable circuit connectors or receptacles on the outside of each of the series of cars or units.

It is an object of this invention to provide an improved measuring device which is a readily portable unit of small size and light in weight.

It is a further object of the invention to provide a self-contained temperature indicating device having an improved thermal-bridge circuit including a test resistance and a supply of electrical energy contained within a small portable casing.

It is another object of this invention to provide a plug-in indicating unit which may be quickly tested and adjusted when it is connected to a refrigerator car or other storage space for indicating air temperatures therewithin.

It is another object of this invention to provide an improved temperature indicating device which may be easily connected to an electrical thermometer system without the use of flexible leads or the like.

It is a still further object of this invention to provide a device of the character described which is inexpensive and sturdy and which has a relatively long effective life.

Other objects and advantages of the invention will be readily apparent from the following detailed description of the preferred embodiment of the invention illustrated in the accompanying drawings in which:

Figure 1 is a front elevation view of the temperature indicating device.

Figure 2 is a vertical elevation view, partly in section, showing structurally the interior of the device illustrated in Figure 1.

Figure 3 is an elevation view of the rear side of the Figure 1 device.

Figure 4 is a schematic wiring diagram of the electrical system contained in the device of Figures 1, 2, and 3.

Figure 5 is a wiring diagram of the electrical system of a refrigerator car or storage space having temperature responsive resistance elements, located at two remote positions within the car.

Figure 6 is an elevation view of a connection receptacle, mounted for access from the outside of said car or space.

Figure 7 is a vertical section view taken on line 7—7 of Figure 6.

Referring to the embodiment of my invention illustrated in the drawings, the measuring apparatus shown in Figures 1, 2, and 3 includes a housing 10 having a front panel 11 and a removable back 12. The panel 11 is provided with an indicating instrument 13, such as a galvanometer, and has a control knob 14 for the variable resistance 15. The front panel also carries push-buttons 16 and 17 for operating the switches 18 and 19. Resistances indicated generally by the numeral 20 (Figure 2), are provided within the housing 10, and may be supported therein from the back of the indicating instrument 13. Resistances 20 are four in number corresponding to the resistances 21, 22, 23, and 24 shown diagrammatically in Figure 4. Said resistances may be formed by winding resistance wire on radially slotted discs with two resistance units being wound on each supporting disc. Other forms of resistance units may be used if desired.

The housing 10 is provided with a recessed back portion indicated by the numeral 25 which supports a socket-type multiple connector 26. The housing 10 also contains a source of electrical energy in the form of one or more small size dry cell batteries 27, one being shown in Figure 2. Spring connector 28 may be provided to connect the batteries, and to permit the easy removal and replacement of the battery cells when necessary. A reinforcing plate 29 may be provided on the top of the housing 10 for purposes to be described hereinafter.

Referring now to Figure 4, the bridge circuit contained in the housing 10 includes fixed resistances 21, 22, and 23, and a fixed test resistance 24 connected as shown. The indicating instrument 13 is connected across one diagonal of the bridge circuit. Resistances 21 and 22 are connected to the variable resistance 15, which in turn is connected to the source of energy 27, the latter being connected to one terminal of the five-terminal connector 26. One end of resistance 23 is connected to two terminals of the connector 26. The push-button switches 18 and 19 are preferably of the double contact type in which each provides a pair of contacts 31 normally closed, and a pair of contacts 32 normally open. The switch arms are interconnected so that when contacts 32 are closed by movement of the push-buttons 16 or 17, the contacts 31 are opened. The movable contacts 32 are connected individually to terminals of the connector 26, and the opposing fixed contacts are connected together to the junction between resistances 21 and 24.

Referring to Figure 5, there is illustrated, diagrammatically, a circuit for two temperature responsive resistance units 35 and 36 connected to a plug type receptacle 37, the latter being a five-terminal connector having two terminals 38 and 39 connected together. The resistance units 35 and 36 may be identical, and one may be positioned on the inside ceiling of a refrigerator car and the other may be remotely positioned adjacent the floor racks of said car, the receptacle 37 being mounted on the exterior surface of the car for convenient access. The receptacle 37 may be mounted as shown in Figures 6 and 7, and be provided with a protective sleeve 40 positioned in a car side wall 41 by a mounting plate 42. A pivoted cover 43 is biased by a spring 44 against the end of the sleeve 40 when the connector is not in use, to protect the terminal prongs 45. The cover 43 may be provided with a urned lip 46 engageable by the plate 29 of the housing 10 to facilitate opening the cover 43 for plugging in connector 26 to receptacle 37.

The operation of the measuring apparatus illustrated will now be described. Assuming that temperature resistance 35 is installed in the upper portion of a refrigerator car or other storage chamber, and that resistance 36 is installed in the lower portion of said chamber, the portable housing 10 is connected to the plug-in receptacle 37, first using the wear plate 29 on the top of housing 10 to lift the cover 43. Connector 26 is then pushed into sleeve 40 so that the terminals of connector 26 engage the prongs 45 of receptacle 37. When this connection is made, the circuit including variable resistance 15 and battery 27 is completed through the cross connection between terminals 38 and 39 of receptacle 37 to apply electrical energy from battery 27 to the bridge circuit including test resistance 24 through closed contacts 31 of the switches 18 and 19. The variable resistance 15 is then adjusted to provide a current flow which will cause the indicating instrument to read a fixed temperature, e. g., 100° F. The variable resistance is provided to allow adjustment of the energy circuit to compensate for possible deterioration of battery 27, and when adjustment of the knob 14 to the position of minimum or no resistance fails to cause the preselected reading of 100°, the battery has deteriorated to the point at which a fresh battery or batteries should be substituted. After the energy supply has been adjusted to cause said fixed calibration reading, the push-button 16 is then pressed inward to open contacts 31 of switch 18, cutting test resistance 24 out of the bridge circuit, and closing contacts 32 of switch 18, cutting in the air temperature responsive resistance 35 in the upper portion of the storage chamber. The air temperature in the vicinity of resistance 35 will then be indicated by the instrument 13. After said temperature reading is noted, the push-button 16 is released and the button 17 is depressed. Button 17 thereupon opens contacts 31 of switch 19 cutting test resistance 24 out of the bridge circuit, and closes contacts 32 of switch 19 cutting into the bridge circuit the temperature responsive resistance 36 in the lower portion of the storage chamber. The air temperature in the vicinity of resistance 36 is then indicated by the instrument 13.

It will be noted that the circuit illustrated provides that the battery circuit is normally maintained open until such time as the connector 26 is electrically connected to a receptacle 37, and that hence the battery 27 cannot be inadvertently applied to the bridge circuit and be run down, while the portable housing is carried about by an inspector or is not in use. It will also be noted that the measuring apparatus may be relatively small in size, even though it includes its own energy supply and a test circuit for indicating the adequacy of the energy supply.

While the apparatus described has been illustrated for the measurement of only two air temperatures, at separated locations within a car or other enclosed space, it will be readily apparent that the device may be easily adapted for measuring any desirable number of air temperatures, by providing additional push-button switches and receptables having terminals in addition to the five shown. The apparatus may also be modified for measuring any other factors which may be measured by proper responsive resistances substituted for the thermal resistances 35 and 36 described. The use of the plug-in type of connectors contributes to the accuracy and long life of the apparatus in that it eliminates the use of flexible leads which often become damaged or shorted. It will also be apparent that many changes in minor details, proportions and design may be made within the scope of this invention as defined in the following claims.

I claim:

1. In electrical measuring apparatus, the combination comprising a housing, a Wheatstone bridge circuit within said housing, said circuit including resistances, an indicating instrument, a source of energy within said housing and a variable resistance in series therewith, a test resistance within said housing connected in said bridge circuit, a plug-in connector mounted on said housing for connecting said circuit to a plurality of external resistances, said source of energy being connected to said plug-in connector for connection to said Wheatstone bridge circuit when said external resistances are connected to said plug-in connector, and a plurality of switches carried by said housing connected to said connector and to said test resistance for simultaneously disconnecting said test resistance and selectively connecting each of said external resistances to said bridge circuit.

2. In electrical measuring apparatus, the combination comprising a housing, a Wheatstone bridge circuit within said housing, said circuit including resistances, an indicating instrument, a source of energy within said housing and a variable resistance connected in series therewith, an external circuit including a plurality of thermal resistances, a plug-in connector mounted on said housing for connecting said bridge circuit to said external circuit, said source of energy being connected to said connector for connection to said bridge circuit through said external circuit, and switches carried by said housing connected to said connector for selectively connecting each of said external resistances to said bridge circuit.

3. In electrical measuring apparatus, the combination comprising a housing, a Wheatstone bridge circuit within said housing, said circuit including resistances, an indicating instrument, a source of energy within said housing and a variable resistance in series therewith, a test resistance within said housing connected to said bridge circuit, a plug-in connector mounted on said housing for connecting said circuit to a plurality of external resistances and to said source of energy, said source of energy being connected to said connector for connection to said bridge circuit only when said connector is plugged in to said external circuit, and a plurality of switches carried by said housing for selectively substituting each of said external resistances for said test resistance in said bridge circuit.

CLIFFORD J. THOMPSON.

REFERENCES CITED

The following references are of record in the file of this patent:

UNITED STATES PATENTS

| Number | Name | Date |
|---|---|---|
| 1,304,277 | Des Isles | May 20, 1919 |
| 1,444,771 | Baker | Feb. 13, 1923 |
| 1,460,530 | Brown et al | July 3, 1923 |
| 1,770,000 | Kuhlman | July 8, 1930 |
| 1,971,423 | McIlvaine | Aug. 28, 1934 |
| 2,153,990 | Paulson | Apr. 11, 1939 |

FOREIGN PATENTS

| Number | Country | Date |
|---|---|---|
| 479,184 | Great Britain | Feb. 1, 1938 |